United States Patent Office 3,838,064
Patented Sept. 24, 1974

---

3,838,064
PROCESS FOR DUST CONTROL
John W. Vogt, South Russell, and James E. Owen, South Euclid, Ohio, assignors to Kewanee Oil Company, Bryn Mawr, Pa.
No Drawing. Continuation-in-part of abandoned application Ser. No. 136,267, Apr. 21, 1971. This application Sept. 19, 1972, Ser. No. 287,578
Int. Cl. C09k 3/22
U.S. Cl. 252—384          9 Claims

ABSTRACT OF THE DISCLOSURE

A method for controlling dust in a normally-high-dusting material which includes working the material with a minute amount, less than about 1% by weight of the material, or a finely divided fibrillatable polytetra-fluoroethylene (hereinafter referred to as PTFE) to form a dry mixture with the material without changing the primary praticle size of the material, and continuing to work the mixture sufficiently so as to essentially negate the dusting of the material without appreciably changing it physical properties. Fine powder PTFE obtained by coagulation of a colloidal aqueous dispersion of the resin is used in the "dry" treatment of normally-high-dusting submicron and superfine material.

Again, the normally-high-dusting material may be mixed with the colloidal aqueous dispersion of the resin, in an amount insufficient to change the essentially dry character of the material and worked, as described herein, to negate dusting of the material.

Alternatively, the fine powder or the colloidal dispersion may be used to slurry the material in a "wet" treatment to facilitate the homogeneous dispersion of the resin; the solids content of the slurry may thereafter be worked in the wet state, preferably as a paste, or worked in an essentially dry state, with a masticating or kneading action, as before.

In another embodiment, for controlling dusting in a normally-high-dusting material, a method is disclosed which includes mixing the material with finely divided fibrillatable PTFE in an amount in the range from about .02 to about 3% by weight in the presence of a liquid processing aid, in which the material may or may not be soluble, and spray drying the solution or slurry so that upon separation of the liquid processing aid, a dry treated solid material is recovered, virtually indistinquishable from untreated material, but characterized by a substantially complete elimination of its normally-high-dusting nature.

Novel dustless compositions are formed by working a normally-high-dusting, submicron or superfine material with a fibrillatable PTFE resin in an amount from about 0.02 to about 1% by weight, based on total solids, until a visual indication of non-dusting is obtained. Even coarse, dusty materials up to about 100 Tyler mesh, which contain fines and superfines are rendered dustless. Dusty materials which include fines in the range from about $10\mu$ to about $44\mu$ or superfines up to about $10\mu$ in size are particularly suitable for dedusting treatment.

CROSS-REFERENCE TO RELATED APPLICATION

This is a continuation-in-part application of Ser. No. 136,267, filed Apr. 21, 1971, which is now abandoned.

BACKGROUND OF THE INVENTION

The dusting of powders has been a problem since the earliest times. Industrial emphasis on the control of dust began in the early years of the coal and the flour-milling industries where the dust was not only a health hazard, from the point of view of ingestion of the dust by breathing, but an explosion and fire hazard as well. In modern plants, particularly those in which pigments are prepared for the paint industry, and most particularly with respect to those pigments that exhibit high-dusting tendencies, the dust evolved is a constant source of annoyance and danger in the plant.

Particularly in the handling of certain metal oxides, such as beryllium and selenium oxides, which are highly toxic and at the same time have an intense proclivity to dust, the elimination of dusting is critical to effect safe handling. Consequently, many attempts have been made to bind the dust in some manner and to control it to some extent. For example, attempts have been made to allay dust by misting water in the air so as to maintain an excess of humidity in the area. Oils have also been used around coal dust to alleviate the problem. Such methods are inapplicable where pigments and other powders are processed by the very requirement that the pigments be dry.

Thus, where dry particulate dusting powders are routinely processed, vacuum systems are used to suck the dust-laden air out to a collection means, such as an air filter, Cottrell precipitator, or the like. In this regard, it might be worth noting that a monumental effort has been directed towards compositions suitable for coating air filters and other dust collection means to entrap dust more effectively and to permit the operation of the dust separation means over relatively long periods of time.

The instant invention is directed to a method for preventing the formation of dust during the processing of finely divided materials, such as pigments, thus dispensing with the requirements of complicated and increasingly more sophisticated dust collection apparatus.

A large number of prior art compositions are directed to the collection of dust which has been spread over an area, such as sweeping compositions, which are useful for sweeping up layers of dust, and compositions which may be applied to cloths, mops, sponges, and the like, which may be contacted with surfaces on which dust is deposited, thus forcing the dust to adhere to the article impregnated with the composition. The instant invention is directed solely to the prevention of dust in bulk, finely divided and superfinely divided, particulate powders which, having been treated in accordance with the instant process, may be handled freely and spread in relatively thin layers without exhibiting dusting. Materials which exhibit high-dusting are exemplified by finely ground silica of less than 325 Tyler mesh, finely ground pigments, flour, and other materials which have a significant superfines content. Other powders in the sub-micron size which have a high tendency to dust are talc, clay, particulate electro-deposited metals and metal oxides formed in certain processes, and particularly carbon black and various forms of activated carbon.

Again, it is well known that the spray-drying of solutions and slurries to yield a particulate dry solid is an operation which must be tightly confined to a spray dryer. A spray dryer used for such a spray-drying operation is usually covered with dust both inside and out. Cleaning such a dryer is an unenviable task, requiring much arduous labor. Utilization of finely divided PTFE in the solution or slurry to be spray dried, not only gives a dry product with substantially no dusting characteristic of its own, but also avoids caking of spray dried material within the spray dryer and dusting in the ambience of the operation.

It is known that certain forms of PTFE may be fibrillated by working particulate forms of the material. The amount of working necessary to form fibrils varies depending upon the particular form of the fibrillatable PTFE as well as the manner in which the polymer is prepared. Thus, relatively high concentrations of PTFE have been worked to develop fibrous characteristics, the end result being an article of manufacture possessing substantially different physical characteristics from that of the original material. Except for these uses, the susceptibility of particular forms of PTFE to fibrillation is a detriment.

The instant invention makes possible convenient handling of even the most high-dusting material by offering a choice of embodiments of a simple process, easily incorporated in existing processing facilities, any of which embodiments effectively suppresses or essentially negates the normally-high-dusting characteristic of the material without appreciably affecting its free-flowing nature or changing its primary particle size.

SUMMARY OF THE INVENTION

It has been discovered that a simple, essentially dry-mixing process, which includes working of fibrillatable PTFE, either as a finely divided, dry "fine powder" or as a colloidal liquid dispersion, in minute amounts less than about 1% by weight, on a total solids basis, with a normally-high-dusting powder, effectively eliminates dusting of the powder without changing the primary particulate size range of the powder, its chemical or apparent physical properties. Working is effected by a gentle simultaneous shearing and mild compacting action, or by a kneading action, until visual inspection indicates that dusting has been sufficiently eliminated, but without impairing the free-flowing property of the powder. The term "working" is used in this specification in the particular sense that such action contemplates a masticating action without necessarily effecting a change in the primary particle size of the high dusting material.

It has been discovered that a minute amount of a fibrillatable PTFE resin may be mixed with a normally-high-dusting powder and a small amount of liquid to form a moist mass or a paste which may be worked to develop fibrils. The working action effectively renders the powder, when dried, essentially dustless without appreciably changing the appearance of the powder. Either a colloidal liquid dispersion of PTFE or a coagulation of the dispersion may be used in an amount in the range from 0.02 to about 1% by weight, based on total solids.

It has also been discovered that mixing a normally-high-dusting powder with a dispersion of finely divided fibrillatable PTFE suspended in a liquid processing aid in which the powder may be soluble or insoluble, then subjecting the liquid mixture to a spray-drying operation, yields a dry, free-flowing powder virtually indistinguishable from the original high-dusting powder, but surprisingly characterized by relatively no dusting.

In another embodiment, it has been found that dusting in a normally-high-dusting powder may be suppressed by mixing the powder in the presence of a relatively large quantity of a liquid processing aid, with a colloidal liquid dispersion of PTFE, or a coagulation of the dispersion. A relatively larger amount of either type of PTFE resin is used, as compared with the amount used when the same normally-high-dusting powder is worked in an essentially dry mass, a moist mass, or a paste, since only limited fibrillation of the resin occurs during mixing in a highly fluid slurry. When the mixed fluid slurry is filtered, a treated filter cake is obtained. The dried filter cake is broken up into a finely divided powder virtually indistinguishable from the original, except that dusting is substantially suppressed in the treated powder.

DETAILED DESCRIPTION OF THE INVENTION

In each embodiment of the instant invention, only a fibrillatable form of PTFE may be used. In particular, the most common form of PTFE is unfibrillatable, granular molding powder, which is ineffective in the process of this invention. Similarly, other carbonaceous polymers such as other polyhalocarbons and polyolefins, silicones and modifications thereof are ineffective in producing comparable non-dusting characteristics in a normally-high-dusting powder without essentially changing its physical characteristics. A fibrillatable form of PTFE is presently restricted to two commercially available types of resin. A first type is a colloidal aqueous dispersion concentrated to about 60% by weight of polymer having particles about 0.05 to about 0.5 microns in size, with average diameters of about $0.2\mu$. A second type, often referred to as "fine powder," is obtained by coagulation of the dispersion. This second type consists of agglomerates with average diameters of $450\mu$ and made up of primary particles ranging in size from 0.05 to $0.5\mu$ in diameter. Specific surface areas of these fine powders are on the order of 10–12 m.$^2$/g., with an average apparent powder density of 475 g./liter. These types of resin and their manufacture are more fully described in U.S. Pat. 2,559,752.

As we understand the influence of these forms of PTFE in the supression of the dusting problem, the essential factor is fibrillation of the PTFE in situ to generate a random network of submicroscopic fibers which are distributed throughout the entire mass of powder, holding the primary normally-high-dusting particles loosely in an agglomerate so as to maintain the essential physical properties of the powder. Such submicroscopic fibers are evident in a treated and worked normally-high-dusting powder under extreme magnification. In a typical example, these fibers are developed in an inorganic pigment having a particle size in the range from less than about 1 micron to less than about 44 microns, when it is mixed and worked with from about 0.02 to about 1% by weight, based on total solids, of fibrillatable PTFE.

Depending upon the properties of the normally-high-dusting material, particularly its size range and particle shape, an amount of PTFE as low as 0.02% by weight, when worked with the material, is found to substantially negate the dusting characteristics of the material; even lower concentrations may effect noticeable palliation of dusting. Continued working of the dried mixture so as to impart an amount of energy to the mixture substantially in excess of the amount required to negate its dusting characteristics, regenerates the dusting characteristics of the normally-high-dusting powder. Should this recidivism of dusting occur, an additional amount of PTFE fine powder may be incorporated into the mixture with additional working so as to again yield a dry non-dusting powder visually essentially indistinguishable from the original normally high-dusting powder. Additional working in excess of the amount required to eliminate dusting, may again result in recidivism which may again be rendered non-dusting with an additional amount of PTFE fine powder subjected to a sufficient working action. In this manner, an amount of PTFE ranging to about 20% by weight, on the basis of total solids, may be incorporated into a dry, finely divided powder, though it will be apparent, depending upon the primary particle size and shape of the original material, incremental additions of PTFE will gradually mask the original physical appearance of the powder. For economic reasons, the lowest amount of PTFE which will render the powder non-dusting, will be the amount used.

In the "dry" process referred to immediately hereinabove, typically, "fine powder" PTFE is preferably homogeneously dispersed in the pigment, which is then subjected to a gentle shearing action with moderate compaction and moderate heating. A desirable masticating or kneading action is provided by a slow-speed electrical mixer equipped with an impeller that smears the mixture in a small laboratory scale receptacle. On a larger production basis, a representative apparatus which provides a suitable working action is a Sigma blade blender such as is used for the kneading of dough in a bakery, or a double cone blender, or a muller of the Simpson type adjusted for clearance so as to provide shear and mild compaction with a minimal amount of grinding. The same type of equipment may be used where the mixture is moist or pasty, or where so small a quantity of a colloidal aqueous dispersion of PTFE is used that the mixture is essentially dry.

The working is preferably effected under moderate heating conditions, preferably above 20° C., since it has been found that formation of the fibers in fibrillatable PTFE occurs more readily above this temperature. More preferably, optimum fibrillation is obtained quickly at temperatures of about 100° C. Higher temperatures may be utilized, limited only by the decomposition temperature of the PTFE or of the normally-high-dusting material, whichever is lower; but for economic reasons, processing temperatures in the range of from about 20° to about 200° C. are found generally satisfactory. In the dry process, working of the mixture for a sufficient period of time, during which enough energy is transferred to the mass so as to provide a visual indication that dusting of the powder has been sufficiently eliminated, completes the dedusting treatment of the pigment. Sintering of the mixture is neither necessary nor desirable. The treated pigment is virtually indistinguishable from the non-treated material in the quiescent state and the primary particle size of the pigment is unchanged. Characteristically, however, it is essentially non-dusting despite being free-flowing.

As has been stated hereinbefore, the amount of fibrillatable PTFE used is not critical. The precise choice of the amount of PTFE required to effect a predetermined degree of suppression of dusting in a particular material is a function of working and is determined by the economics of the cost of materials, balanced against the energy costs of processing them. A desirable level of dust suppression in a normally-high-dusting powder may be achieved with a relatively small amount of PTFE and, correspondingly, a greater amount of working, but less than that required for recidivism of dusting. Alternately, a relatively large amount of PTFE may be used to effect the same degree of dust suppression, but requiring relatively less working. Thus, it will be apparent that at lower concentrations of PTFE substantially lower than 0.02% by weight level, continued working of the material for a long period of time to effect fibrillation, uneconomical high-dusting characteristics of a submicron or superfine powder. On the other hand, the addition of a relatively larger amount than 0.02% PTFE may, with sufficient working of the mixture, form a coherent, pliable mass, and the addition of such a large amount should be avoided.

The effectiveness of fine powder PTFE in the process described hereinabove, conveniently referred to as the "dry" process, is particularly surprising since fine powder PTFE is made up of primary particles ranging in size from about $0.05\mu$ to about $0.5\mu$ in diameter, and is itself a normally-high-dusting material. In its commercially available form, it is treated to form agglomerates with average diameters of $450\mu$, and it is only in this form that it is not a high-dusting powder.

As mentioned hereinbefore, it is preferred that fibrillatable PTFE be homogeneously dispersed in the normally-high-dusting powder. Obtaining such a homogeneous dispersion in the dry state may be inconvenient, if not difficult, due to mixing and dusting problems. A convenient method of obtaining such a dispersion which may then be worked to yield a dustless composition is embodied in the "wet" process of this invention.

In the first step of the "wet" process, a normally-high-dusting powder is slurried with a colloidal aqueous dispersion of PTFE, or with fine powder PTFE, in a liquid processing aid in which the high-dusting powder is essentially insoluble. The amount of PTFE used to effectively treat a normally-high-dusting powder will approximate the amount used in the dry method described hereinabove, though, because of the relative ease of obtaining a homogeneous dispersion in liquid form, the total amount of energy imparted to the normally-high-dusting powder to negate its dusting may be somewhat less, all other processing conditions being the same.

The amount of liquid processing aid in this "wet" process is not critical, and serves merely quickly to effect dispersion of the PTFE in the mass of normally-high-dusting material. It will be recognized that with very low amounts of liquid processing aid, less than that amount required to form a smooth paste, a homogeneous mixture will be less conveniently effected than with a sufficient quantity of liquid to form a smooth paste or a fluid, easily mixed slurry. Enough liquid is used to form a paste or slurry which when subjected to a mixing action, preferably in a low speed mixer such as a Hobart or Banbury mixer, effects a homogeneous dispersion of the PTFE in the mixture. During mixing, some incidental and initial fibrillation of the PTFE will generally be experienced, the extent of fibrillation depending upon the physical characteristics of the slurry, the amount of PTFE used, the type of mixer used to effect dispersion, the intensity of the mixing action, the temperature at which mixing is carried out, and the length of time over which it is effected. It is generally uneconomical to effect a sufficient degree of mixing in the liquid highly fluent state to essentially completely negate the dusting of a superfine powder. From a practical point of view, only sufficient energy is expended in mixing the slurry as is required to effect a homogeneous dispersion of the PTFE in the mixture, after which the liquid processing aid is separated from the solid materials in the mixture preferably without the addition of filter aids or precipitation agents which may adversely affect the essential properties of the treated powder.

In the second step of the wet process, separation of solids is effected by any conventional means, such as filtration, centrifuging, and the like. The solid material obtained is an essentially homogeneous workable mass, in which, though contaminated with liquid processing aid, is subsequently worked for a sufficient period of time to effect fibrillation of the PTFE and the worked mass is then dried by conventional means, for example, in a convection oven.

It will be recognized that a careful choice of the amount of liquid processing aid used, in many instances, will permit the formation of a homogeneous workable mass, at the same time obviating the necessity of separating excess liquid. It will likewise be apparent that, where such an excess quantity of liquid is present, and a substantial portion of the excess is to be removed, such removal may be effected prior to the working step, as described hereinabove; or during the working of the workable mass; or after the working is completed. In general, it is preferable to remove essentially all liquid after obtaining the homogeneous mixture, as by filtration, and subsequently to dry the filter cake. The dried filter cake is then subjected to further working as described in the "dry" process hereinbefore, until an indication of the desired degree of dustlessness is attained.

It has been noted that, in a liquid, highly fluent but relatively dense slurry of certain normally high-dusting-powders with a relatively large amount of PTFE, in the range from about 0.1 to about 20% by weight on a total solids basis, homogeneously dispersed therein solely by mixing, a filter cake of solid material may be obtained which, upon drying, may be disintegrated to a finely divided, free-flowing powder, virtually indistinguishable from the original, but with substantially suppressed dusting. The degree of suppression obtained depends upon the physical characteristics of the slurry, the particular properties of the normally-high-dusting powder, the particular mixing conditions, and the amount of energy expended in mixing. For example, for a particular high-dusting-powder mixed with about 1% by weight of fibrillatable PTFE, more dust suppression will be obtained after a thick, relatively dense slurry is mixed and dried than after a thin, relatively less dense slurry is mixed and dried, assuming the mixture energy is the same in each case. From a practical point of view, however, it is desirable to use relatively smaller concentrations of PTFE, to expend less mixing energy over a relatively short period of time, and thereafter to work the solid material separated from the liquid slurry as in the dry process described hereinbefore.

In the "wet" embodiment, mixing of the liquid slurry is conveniently effected at a temperature in the range from about 20° to about 200° C., as is the working of the solid material separated from the slurry. Mixing of the liquid slurry may be effected in any conventional mixing equipment. Working of the solid material separated from the slurry is preferably effected in equipment similar to that used in the dry process, namely a Sigma blade blender, a double cone blender or a Simpson type muller, properly adjusted to provide the desired working action. The particular processing temperature will depend upon the properties of the powder and of the liquid processing aid. The wet process is particularly suitable for the homogeneous dispersion of PTFE in submicron and superfine powders. Where a superfine powder, desirably processed with a liquid processing aid is known to be water-sensitive or hydrophobic, any suitable liquid may be used which is essentially inert to both the water-sensitive powder and to PTFE. Preferred processing aids other than water are those which may be easily separated essentially completely from the solid treated material, and include the primary alcohols, particularly the lower alcohols having from 1 to about 8 carbon atoms, ketones and glycols, particularly those having less than about 15 carbon atoms, silicones, liquid polyhalocarbons and liquid hydrocarbons.

It will be found that a normally-high-dusting powder having a primary particle size of less than about 100 Tyler mesh, with a major portion in the range from about 325 to about 100 Tyler mesh, may be conveniently dry-blended and worked without the intermediate step of slurrying the powder with a liquid processing aid and thereafter eliminating the liquid processing aid.

In another embodiment, a normally-high-dusting powder may be incorporated in a liquid processing aid, with minute quantities of fibrillatable PTFE in the range from about 0.02 to about 1%, and then subjected to a working action in a spray drier, to form a spray-dried powder visually essentially indistinguishable from the normally-high-dusting powder except that it exhibits essentially no dusting while maintaining its free-flowing nature. The amount of fibrillatable PTFE incorporated in a spray-dryable liquid processing aid to essentially negate the dusting of a normally-high-dusting powder depends upon the solubility of the high-dusting-powder in the liquid processing aid, the concentration of solids in the feed to the spray-drier, the spray-drying temperature, the amount of working action to which the spray-dryable liquid is subjected in the orifices from which the liquid is discharged into the spray-drier, the volumetric flow of gases sweeping the interior of the spray-drier, and other factors. Relatively large amounts of PTFE may be incorporated into the spray-dryable liquid, ranging up to about 20% by weight based on total solids, but it will generally be found that at concentrations in excess of about 3%, the physical properties of the spray-dried, treated material begin to get visually noticeably different from those of the untreated material. From a practical standpoint, it will be found that a concentration of PTFE of less than about 1% by weight on a total solids basis will essentially negate the dusting of most normally-high-dusting powders.

A major application of the instant process is found in control of large volume, industrial normally-high-dusting inorganic solids such as pigments, fillers, and the like, which must be finely divided for satisfactory performance in the end products which incorporate them. The instant process permits dedusting or rendering dustless, a normally-high-dusting material which, after treatment, may be handled conveniently without a dusting problem, yet disintegrates readily when processed in the usual manner, since the essential physical properties of the material appear to be unchanged. Even in those materials where the surface area is of critical importance, such as in activated carbon, silica gel, or alumina, which are used primarily as sorbents or in catalysts, treatment of the materials as taught in the instant process renders them dustless without noticeably reducing their surface area. Active particles rendered dustless are neither cemented together nor encapsulated, and there is no detectable masking of the active area of the particles by PTFE fibrils.

An incidental benefit of dedusting a normally-high-dusting powder having a relatively wide range of particle sizes is to prevent segregation of particles due to size or density differences. This is particularly important where different powdered materials are to be homogeneously blended and thereafter maintained in a well-blended condition. For medicinal preparations, the maintaining of finely divided dispersions in a homogeneous condition insures proper dosage of each powder. Another incidental benefit of the instant process is that the surfaces of equipment used in processing treated material acquire a thin layer of PTFE, which reduces adhesion and frictional resistance to transfer of material. The surfaces remain clean. Particularly where processing equipment includes heat transfer surfaces, the thermal efficiency of the equipment is improved and economies of cost and time are achieved with clean equipment.

The use of fibrillatable PTFE, which is essentially inert, permits incorporation of these materials into foodstuffs both for animal and human consumption. Normally-high-dusting foodstuffs for human consumption include beverages which are marketed in the form of dissolvable powders, various drugs and medicaments, confectioner's sugar, highly milled flours such as cake flour, and the like. Incorporation, prior to finishing and packaging, of a negligibly small amount of PTFE in a comestible high-dusting powder, such as the ones described hereinbefore, essentially eliminates the dusting problem. Where comestible "instantly" dissolvable solids are formed by spray-drying, the incorporation of PTFE prior to spray-drying, as described hereinbefore, essentially eliminates the dusting of the spray-dried product. The following examples more clearly illustrate the instant invention.

EXAMPLES 1–15

In the following examples are enumerated a plurality of normally-high-dusting pigments which are rendered essentially non-dusting by a method comprising slurrying the pigment in a sufficient quantity of a hot liquid processing aid to yield a smooth slurry, adding a small quantity of a fibrillatable Teflon® PTFE resin, such as Teflon® 6, Teflon® 30 and Teflon® 42, less than about 3% by weight of the combined weight of PTFE resin and pigment, blending it mannually or in a mechanical blender for a short period of time in the range of about 1 to 15 minutes, filtering the mixture and drying the wet solids on a hot plate or in any conventional drying equipment such as a convection oven. The treated, dried composition of each example in which the PTFE resin is homogeneously dispersed is warmed to a temperature in the range from about 50° to 200° C. and gently worked in a slow speed Hobart electric mixer or by manually spatulating the material to develop additional fibrillation of the resin and to render the dried pigment essentially non-dusting and essentially indistinguishable from the original normally-high-dusting pigment except when it is disturbed. No grinding of the pigment is effected and the primary particle size is unaffected. For example, even when a pug mill is used to provide the necessary working action, only a very small amount of a grinding action which effectively reduces the primary particle size of the normally-high-dusting material, is apparent. In general, the conditions for working the workable mass are so chosen that reduction in primary particle size of the material is negligible. In each of the pigment examples listed hereinafter in Table I, the degree of tinting attained with the dustless pigments was identical with that of the normally-high-dusting pigment indicating there was no noticeable size reduction.

Dustlessness of a pigment is determined by placing a small quantity on a paper card and then pouring it off the card. A normally-high-dusting pigment leaves a readily visible deposit of pigment adhering to the paper card. An essentially non-dusting pigment leaves no significant trace. In another test, the degree of dusting may be approximated when pigment is shaken in a transparent bottle. Treated pigment generates essentially no dust and substantially no pigment adheres to the walls of the bottle. The novel, treated compositions may be used in the same application as the original high-dusting pigments, behave in a similar manner with respect to ease of dispersion and give excellent results without posing an undesirable dusting problem.

TABLE I

| Ex. | Powder | PTFE dispersion and weight percent solids | Liquid processing aid and treatment |
|---|---|---|---|
| 1 | Cadmium Lithopone 1026*, Color index #77196. | Teflon® 30, 0.5. | Water—mix in Waring blender for 10 minutes. |
| 2 | Cadmium Lithopone 1026* and zinc stearate. | ---do------ | Do. |
| 3 | Phthalo Blue 4863*, Color index #74160. | ---do------ | Water—manually blended with spatula. |
| 4 | Cadmium Lithopone 1026*, Color index #77196. | ---do------ | Mineral spirits manually blended. |
| 5 | C.P. Cadmium Yellow 1470*, Color index #77199. | Teflon® 30, 1.0. | Water—manually blended. |
| 6 | Iron Blue 4050*, Color index #77510. | ---do------ | Do. |
| 7 | Benzidine Yellow 1266* | ---do------ | Do. |
| 8 | Dianisidine Orange 2915*, Color index #21160. | ---do------ | Do. |
| 9 | Carbon Lampblack, Color index Black 6. | ---do------ | Do. |
| 10 | Coated mica, Pearl "Afflair" (Du Pont T.M.). | ---do------ | Do. |
| 11 | Pigment Scarlet 1060-01*, Color index #16105. | Teflon® 30, 0.8. | Mineral spirits—manually blended. |
| 12 | Permanent Red 1057*, Color index #15865. | ---do------ | Do. |
| 13 | Aluminum powder, Alcoa Aluminum Pigment 101. | Teflon® 30, 1.0. | Do. |
| 14 | Antimony oxide KR* | ---do------ | Do. |
| 15 | Phthalo Blue 4863*, Color index #74160. | ---do------ | Water—blended in Cowles Dissolver. |

*Numbers and code letters denote materials listed in the brochure of The Harshaw Chemical Company entitled "Harshaw Pigment Colors."

EXAMPLES 16–18

In the following examples are listed several normally-high-dusting pigments which are rendered essentially non-dusting by a method comprising dry-blending the pigment with a small quantity of fibrillatable PTFE resin in a Waring blender which effects a homogeneous dispersion of the resin in the pigment and thereafter subjecting the blend to a working action at a temperature in the range from about 50° to about 150° C. in a pug mill or a Hobart mixer or manually. Despite the use of a pug mill, because of the small primary particle size of the materials (less than 325 mesh), no grinding is effected. Working is discontinued when dusting has subsided.

TABLE II

| Ex. | Pigment | PTFE Resin | Treatment |
|---|---|---|---|
| 16 | Phthalo Blue 4863*, Color index #74160. | Teflon® 6, 1.0% by weight. | Dry blended to dustless state. |
| 17 | Antimony Oxide KR*. | -----do--------------- | Do. |
| 18 | ---------do.* | Teflon® 6, 0.1% by weight. | Do. |

*Numbers and code letters denote materials listed in the brochure of The Harshaw Chemical Company entitled "Harshaw Pigment Colors."

When an equivalent amount, by weight of solids, of a colloidal aqueous dispersion of Teflon® 30 is substituted for the fine powder Teflon® 6 in each of the examples above, an essentially dry mixture results which is similarly worked to yield comparable dustless compositions.

EXAMPLES 19–22

In the following examples are enumerated several varyingly soluble dyes which are usually spray-dried as super-saturated slurries to form normally-high-dusting powders. They are rendered essentially dust-free by slurrying the dyes with a suitable liquid processing aid in combination with a small amount of fibrillatable PTFE resin, less than 3% by weight, based on total solids, and then spray-drying the slurry in a conical-bottom spray dryer. The spray-dried dye is essentially non-dusting and the spray dryer remains unexpectedly clean. Conditions of operation of the spray dryer are regulated to the specific dye. A typical dye is spray-dried with an inlet air temperature of about 200° C. and an outlet air temperature of about 80° C. Though the size of the spray-dried particles may vary widely, depending upon the particular dye being spray dried, the extent to which the material is soluble in the liquid, and the degree of dryness of the spray-dried product, the product is essentially dustless. As will be apparent from Example 19 hereinbelow, solubility of the dye in the liquid processing aid is not essential. The conditions of spray-drying, however, will depend upon the nature of the feed to the spray-dryer, including solubility of the material in the feed.

TABLE III

| Ex. | Dye | Teflon® 30, percent | Feed to spray dryer |
|---|---|---|---|
| 19 | Celutate Yellow (insol.) Disperse Yellow 3*, Color index #11855. | 0.2<br>1.0<br>2.0 | Slurry.<br>Do.<br>Do. |
| 20 | Black DFE*, Color indices—Direct Black 38 and 30235. | 0.2<br>0.5<br>1.5 | Concentrated solution.<br>Saturated solution.<br>Slurry. |
| 21 | Turquoise LGL*, Color indices—Direct Blue 86 and 74180. | 0.2<br>0.4<br>1.0 | Saturated solution.<br>Concentrated solution.<br>Slurry. |
| 22 | Belamine Blue 8GLN* | 0.05<br>0.25<br>1.0 | Saturated solution.<br>Concentrated solution.<br>Slurry. |

*Codes and numbers represent materials listed in brochure of The Harshaw Chemical Company entitled "Harshaw Pigment Colors."

In each of the above runs, the spray dryer remains clean where fibrillatable PTFE is used. In contrast, runs made without the PTFE additive result in excessively dusty dyes and necessitate a laborious clean-up of the spray dryer.

EXAMPLE 23

200 g. of potassium fluoborate, $KBF_4$ (finely divided powder, 90% thru 200 mesh) and 0.20 g. PTFE in the form of a coagulated dispersion of polymer having an agglomerate size in the range from 50 to 5000 microns such as Teflon® T-6 powder, were placed in a single speed Waring Blender, Model Cat. #700 (¼ H.P., 15,000 r.p.m. no-load speed). The material was then blended for a period of 30 seconds. The blended material was highly dusty after this mixing operation. The mixture was placed in a wide-mouth 8 oz. glass jar and heated in an oven to a temperature of 95° C. over a period of 1½ hours. The hot mixture was removed from the oven and rotated in the jar at 40 r.p.m. for a period of 2 minutes (temp. ~ 85° C.). During this working operation, the material changed from a high dusting product to one which is essentially non-dusty.

EXAMPLE 24

200 g. of potassium fluoborate, $KBF_4$ (finely divided powder, 90% thru 200 mesh) and 0.33 g. PTFE in the form of an aqueous colloidal dispersion of polymer (60% solids) having a primary particle size in the range from 0.5 to 5 microns, were placed in the Waring Blender described hereinabove. The material was then mixed for a period of 30 seconds. The slightly damp mixture was placed in a wide-mouth 8 oz. jar and heated in an oven over a period of 1½ hours to a temperature of 95° C. The hot mixture was removed from the oven and rotated in the bottle at 40 r.p.m. for a period of 2 minutes. After this working operation, the resulting material was essentially dustless.

EXAMPLE 25

200 cc. of water were placed in a 500 cc. glass beaker. 200 gms. of potassium fluoborate, $KBF_4$ (finely divided, 90% thru 200 mesh) were added gradually and mixed for a 10 minute period. 0.33 g. PTFE in the form of an aqueous colloidal dispersoin of Teflon®-30 polymer 60% (solids) having a primary particle size in the range from 0.05 to 0.5 microns, was added and mixed for a 10 minute period. The slurry was filtered and the filter cake dried at 105° C. for 16 hours. The hot dried cake was disintegrated in a Waring Blender for 30 seconds during which period it exhibited progressive palliation of dusting. The resulting powder was placed in an 8 oz. glass jar and rotated at 40 r.p.m. for 2 minutes. During this working operation, the material became essentially dustless.

EXAMPLE 26

200 cc. of mineral spirits were placed in a 500 cc. glass beaker to which 200 grams of potassium fluoborate, $KBF_4$ (90% thru 200 mesh) were added gradually, over a ten minute period with continued stirring using a Lab Stirrer (Palo Laboratory Supplies Model 7609C) fitted with a glass stirrer. 0.20 g. PTFE (T6 fine powder referred to hereinabove) were added to the slurry and mixed for 10 minutes. The mixture was filtered and the filter cake placed in a drying oven at 105° C. After approximately 30 minutes, the partially dried, damp filter cake was split into two roughly equal parts. One part was placed in a hot mortar at about 70° C. and gently worked manually about 5 minutes. At this time the worked material contained about 1% mineral spirits. The worked material was returned to the drying oven, and together with the unworked filter cake, dried at 105° C. for 16 hours. After drying, the worked and unworked materials were removed from the oven and cooled to room temperature, both portions presenting a visual appearance of dry particulate, free flowing powders. The worked material was significantly superior in dustlessness when compared to the unworked portion.

We claim:

1. A process for controlling dust in a normally-high-dusting, solid particulate material other than polytetrafluoroethylene resin, said material being in a size range less than about 100 Tyler mesh, comprising mixing said material with a sufficient amount of fibrillatable polytetrafluoroethylene resin to form a workable mass, and working said mass at a temperature above 20° C. but lower than the decomposition temperature of said material or said fibrillatable polytetrafluoroethylene resin, whichever is lower, until a random network of fibers of said polytetrafluoroethylene resin is formed to give a visual indication of non-dusting.

2. The process of Claim 1 for controlling dust in a normally-high-dusting solid particulate material, wherein said fibrillatable polytetrafluoroethylene resin is added in an amount in the range from about 0.02 to about 20 percent by weight, based on total solids, in the form of a fine powder, or, as a colloidal liquid dispersion.

3. The process of Claim 2 for controlling dust in a normally-high-dusting solid particulate material, wherein said fibrillatable polytetrafluoroethylene resin is added in an amount in the range from about .02 to less than 1 percent by weight, based on total solids.

4. The process of Claim 1 for controlling dust in a normally-high-dusting solid particulate material, including adding a sufficient amount of liquid processing aid, which is essentially inert to both said particulate material and said polytetrafluoroethylene resin prior to mixing said polytetrafluoroethylene resin, and, after working said mass, removing said liquid processing aid to obtain a finished product having a random network of fibers of said polytetrafluoroethylene resin to give a visual indication of non-dusting.

5. A process for controlling dust in a normally-high-dusting solid particulate material other than polytetrafluoroethylene resin, comprising, blending said material having a size range less than about 100 Tyler mesh with less than 20% by weight, based on total solids, of a fibrillatable polytetrafluoroethylene resin, in the form of fine powder or as a colloidal liquid dispersion, to form an essentially dry mixture, and thereafter subjecting said mixture to a working action at a temperature above 20° C. but lower than the decomposition temperature of said material or said fibrallatable polytetrafluoroethylene resin, whichever is lower, until visual dusting of said mixture is essentially negated without appreciably changing the primary particle size of said material.

6. The process of Claim 5 for controlling dust in a normally-high-dusting solid particulate material wherein said polytetrafluoroethylene resin is in an amount in the range from about 0.02 to less than 1 percent by weight, based on total solids, in the form of a fine powder, or, as a colloidal liquid dispersion.

7. A process for controlling dust in a normally dusty material to be formed from a liquid feed containing said material, and decreasing adhesion of said material to the internal surfaces of a spray-drying apparatus, comprising dispersing in the feed to said apparatus sufficient fibrillatable polytetrafluoroethylene resin to form a workable mass, spray-drying said feed to effect fibrillation of said polytetrafluoroethylene at a temperature above 20° C., but below the decomposition temperature of said material or said fibrillatable polytetrafluoroethylene resin, whichever is lower, and to form a random network of sufficient fibers of said polytetrafluoroethylene resin to give a visual indication of non-dusting.

8. The process of Claim 7 for controlling dust in a normally-high-dusting solid particulate material wherein said fibrillatable polytetrafluoroethylene is added in an amount in the range from about 0.02 to about 20 percent by weight, based on total solids, in the form of a fine powder, or, as a colloidal liquid dispersion.

9. The process of Claim 8 for controlling dust in a normally-high-dusting solid particulate material wherein said fibrillatable polytetrafluoroethylene resin is from about .02 to less than 1% by weight, based on total solids.

References Cited

UNITED STATES PATENTS 2,961,712   11/1960   Davis _____ 117—100 M

CARL D. QUARFORTH, Primary Examiner

I. GLUCK, Assistant Examiner

U.S. Cl. X.R.

117—100 C